United States Patent Office 3,816,574
Patented June 11, 1974

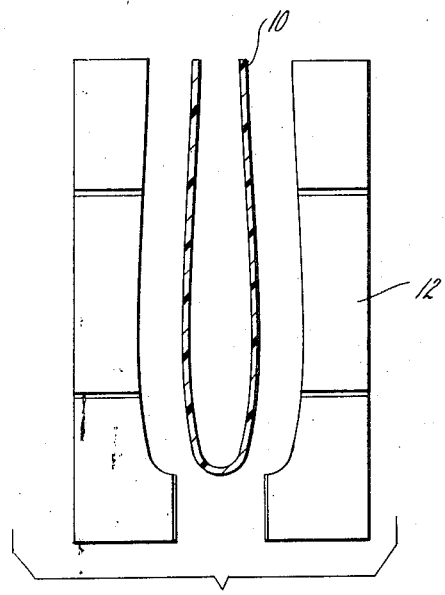
FIG_1
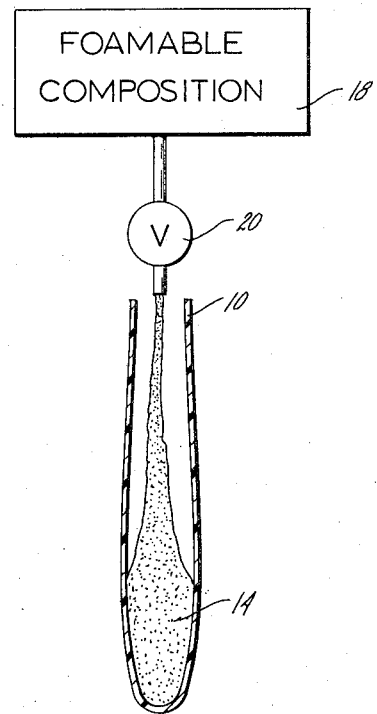
FIG_2
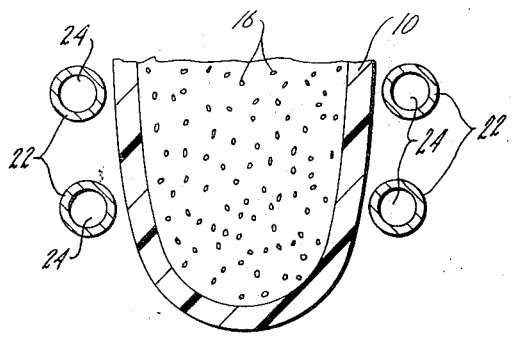
FIG_3
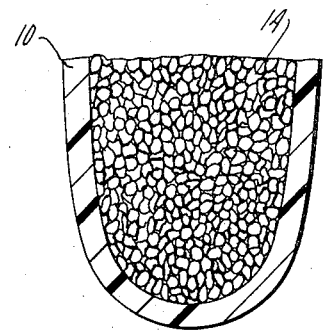
FIG_4

3,816,574
METHOD OF FOAMING PLASTICS USING AN ALTERNATING MAGNETIC FIELD
William C. Heller, Jr., 1840 N. Farwell Ave., Milwaukee, Wis., and Alfred F. Leatherman, Columbus, Ohio; said Leatherman assignor to said Heller
Continuation-in-part of abandoned application Ser. No. 882,920, Dec. 8, 1969. This application Mar. 31, 1972, Ser. No. 239,919
Int. Cl. B29d 27/00; H05b 9/00
U.S. Cl. 264—45                                    7 Claims

ABSTRACT OF THE DISCLOSURE

A method of producing an article having a hollow shell filled with an expanded foam. The hollow shell is formed of a material of which transmits an alternating magnetic field. The hollow shell is filled with a foaming agent comprised of a foamable liquid, having uniformly dispersed therein inductively heatable susceptor particles. The article is subjected to an alternating magnetic field which heats the particles, expands the foamable liquid, and fills the interior of the hollow shell.

CROSS-REFERENCE TO RELATED APPLICATION

This application is a continuation-in-part application of U.S. patent application, Ser. No. 882,920, filed Dec. 8, 1969, and now abandoned.

BACKGROUND OF THE INVENTION

Field of the Invention

The present invention relates to the manufacture of articles having an expanded plastic foam core.

Description of the Prior Art

It is often desired to manufacture articles formed of a plastic, hollow shell filled with a foamed core. For example, in recent years automobile safety requirements have brought about the installation of numerous padded elements, such as sun visors and dash boards, in vehicles. Automotive and other seating applications may also employ such articles.

In the past, articles, such as sun visors, have proven difficult to manufacture. The article core may be cut to size and the shell fabricated around it. However, this many be time consuming and tedious and the complete product may not have the desired finish. A precut core may be slipped into a hollow shell only with difficulty and the mating of the two elements is usually poor.

The poor heat transmitting characteristics of the plastic shell has precluded the insertion of an unfoamed core into the hollow shell to be foamed in situ. The shell prevents obtaining temperatures of the magnitude and evenness necessary for satisfactory in situ foaming.

SUMMARY OF THE PRESENT INVENTION

The present invention is thus directed to an improved method for forming foamed filled articles which alleviates the problems heretofore encountered in the production of such articles.

Briefly, the present invention contemplates the injection of a foamable liquid containing inductively heatable susceptor particles in the hollow shell. After injection, the article is exposed to an alternating magnetic field to heat the particles and expand the composition within the hollow shell.

In as much as the practice of the method of the present invention generates heat within the shell, rather than requiring the transmission of external heat, fully adequate and thorough foaming is obtained while, at the same time, the possibility of heat degradation of the shell, attendant prior art in situ foaming processes, is completely overcome.

BRIEF DESCRIPTION OF THE DRAWING

FIG. 1 is a cross sectional view showing a step in forming a hollow shell.

FIG. 2 shows another step in the process of the present invention, said step comprising injecting a foamable liquid composition into the hollow shell.

FIG. 3 is a detailed cross sectional view showing the filled hollow shell and the additional step of exposing the filled shell to an alternating magnetic field.

FIG. 4 is a detailed cross sectional view showing a portion of the completed article manufactured by the process of the present invention.

DESCRIPTION OF THE PREFERRED EMBODIMENT

Turning now to the Figures, there is shown therein a typical embodiment of the method of the present invention. While the article formed by the process of the present invention is shown in the Figures and described herein as an automobile sun visor, it will be appreciated that numerous other articles may be so constructed.

In the Figures, the numeral 10 indicates a hollow shell for a foam core article. Hollow shell 10 may be formed of a sheet of any commonly available plastic material, for example, polyvinyl chloride. The plastic may be placed in vacuum thermo-forming die 12 which forms the plastic sheet into the desired hollow shell 10. In the case of an automobile sun visor, hollow shell 10 may comprise an envelope having one open end into which may be injected the foamable composition 14 described next below.

Composition 14 is formed of a foamable liquid. Such a material may be selected from available urethane liquids. Vinyl plastisols may also be employed. The foregoing liquids produce a resilient or semi resilient foam. In the event a more brittle foam is desired, a liquid epoxy, or polyester resin compound may be utilized.

A blowing agent is incorporated in the liquid of foamable composition 14. This agent may be a solid granular material such as ABFA (azobisformamide) or azodicarbonamide which decomposes to produce gas in a range of from 160° to 200° C. In the alternative, a liquid having a low boiling point, such as Freon 11 (dichlorodifluoromethane), may be used as the blowing agent in foamable composition 14.

There is also added to foamable composition 14 susceptor particles 16 (see FIG. 3) heatable upon exposure to an alternating magnetic field. Susceptor particles 16 are incorporated in foamable composition 14 in quantities sufficient to produce the heating action necessary to raise the temperature of the blowing agent to the decomposition temperature. This is typical 5 to 50% by weight with respect to the foamable liquid of the composition.

The susceptor particles may be compounds comprising, at least in part, electrically nonconductive metallic oxides having thermo-hysteretic properties. The oxide compounds gamma $Fe_2O_3$ and $Fe_3O_4$ have been found to be particularly useful susceptors. $CrO_2$ may be used. Ferrite materials may also be used.

In addition to their high heat generating properties by hysteresis losses, such compounds may be reduced to extremely small size. The size reduction is without loss of heat generating properties. The size reduction minimizes any tendency of the susceptor particles to settle out and facilitates handling and compounding by known existing equipment to the ends of economy and commercial production. Metallic oxide susceptors may be reduced to submicron particle sizes, for example, .01 microns. Typically, the particles might range in size from submicron to 20 microns. However, since a fewer number of large particles will provide the same particle loading as a large number of small particles, under certain circumstances, large particles may be employed to reduce coloration of the foam composition. Such large particles may have sizes ranging up to 250 microns.

Foamable composition 14 so formed may be stored in tank 18 and injected into hollow shell 10 by means of valve 20.

After the desired amount of foamable composition 14 has been injected into hollow shell 10, the shell is placed in an alternating magnetic field, such as that established by coils 22, as shown in FIG. 3. When the induction coils are energized, the high frequency magnetic field established by the work coil penetrates throughout the chemical mixture and creates a thermo-hysteretic effect in the susceptor particles. Each particle becomes heated on an individual basis and this heat immediately being conducted into the contingent and surrounding portions of foamable composition 14.

The magnetic field has a negligible or zero effect directly on the intermediate chemical composition itself in the normal case since there is no effective mechanism by which heat is generated in such organic material by means of a magnetic field. Thus the main volume of the chemical composition remains cool while sufficient local temperature rises occur at each particle to initiate local release of gas causing foaming and forming the foamed core for article 10, as shown in FIG. 4. When the magnetic field intensity is high enough, it is believed that considerable foam development can occur in this manner with relatively little heat development in the general body of the foaming chemical. The unique property of localized heat generation of the present invention will be found to offer possibilities for entire new classes of foaming materials that could not be used previously because of excessive heat damage. Thus, it can be seen that this unique attribute differs drastically from both the microwave or dielectric method and the conventional oven method in which no choice exists but to develop heat throughout the entire mass.

Further, as the foaming proceeds, the relative density of the susceptor particles decreases due to the expansion of the chemical composition. This tends to decrease the heat generated per unit of volume providing a measure of self regulation to the heating process which avoids heat degradation or damage to the chemical composition.

Additional improvements and advantages result from the unique characteristics of the induction foaming method of the present invention. When the attempt is made to apply dielectric and microwave approaches of past methods to foaming of mixtures that contain a certain amount of ionized liquid, it is found that the electrically conductive quality of the liquid can in effect "short circuit" the applied electric field resulting in seriously reduced heating rate in the liquid. With the method of the present invention, on the other hand, those skilled in the art will recognize that the liquid mass to be foamed can actually become quite conductive electrically without seriously hampering the penetration of the magnetic field of the present approach.

The frequency of the alternating magnetic field may be selected in accordance with desired heating rates, type of susceptor utilized, etc. The frequency may typically be from .4 to 5000 megahertz. Typically, the frequency range of the field will range from 2 megahertz to 30 megahertz for the conventional helix-type of induction coil. It is desirable for the magnetic field strength to exceed 50 oersteds and preferably to exceed 100 oersteds. Coils 22 may be cooled by coolant circulated in passages 24, to prevent any possible scorching or degradation of hollow shell 10. After foaming has been effected, shell 10 may be removed from coils 22 and the fabrication of the foam core article is complete.

Various modes of carrying out the invention are contemplated as being within the scope of the following claims particularly pointing out and distinctly claiming the subject matter which is regarded as the invention.

We claim:

1. A method of producing a foam core article comprising the steps of:
   forming a hollow shell of a material capable of at least partially transmitting an alternating magnetic field, said shell forming a portion of the finished article and being further capable of containing a liquid and resisting forces generated by foaming within the shell;
   dispersing, in a foamable liquid capable upon heating of forming an expanded foam composition a particulate susceptor in a size range of from .01 to 20 microns and consisting essentially of electrically non-conductive metallic oxides having thermo-hysteresis properties, said particulate susceptor being incorporated in the liquid in quantities sufficient to heat the liquid to a foamable condition;
   injecting the liquid carrying the particulate susceptor into the hollow shell; and
   exposing the liquid carrying the particulate susceptor to an alternating magnetic field of sufficient strength within a frequency range of .4 to 5000 megahertz to heat the particulate susceptor and the liquid to form an expanded foam composition within the hollow shell.

2. The method according to claim 1 wherein said liquid is foamable by internal gas production and said method is further characterized as subjecting the liquid carrying the particulate susceptor to an alternating magnetic field for generating the internal gas-producing heat.

3. The method according to claim 1 wherein the step of dispersing the particulate susceptor is further defined as dispersing a susceptor selected from a class consisting of gamma $Fe_2O_3$ and $Fe_3O_4$ in said liquid.

4. The method according to claim 1 wherein the step of dispersing the particulate susceptor is further defined as dispersing 5 to 50% particles by weight with respect to the foamable liquid.

5. The method according to claim 1 wherein the exposing step is further defined as exposing the liquid to an alternating magnetic field having a frequency of between 2 and 30 megahertz.

6. The method according to claim 1 wherein the exposing step is further defined as exposing the liquid to an alternating magnetic field having an intensity in excess of 50 oersteds.

7. The method according to claim 6 wherein the exposing step is further defined as exposing the liquid to an alternating magnetic field having an intensity in excess of 100 oersteds.

References Cited
UNITED STATES PATENTS

| | | | |
|---|---|---|---|
| 3,086,247 | 4/1963 | Rubens | 264—Dig. 17 |
| 2,393,541 | 1/1946 | Kohler | 264—45 X |
| 3,294,879 | 12/1966 | Jacobs | 264—26 |
| 3,420,923 | 1/1969 | Ashworth et al. | 264—54 X |
| 3,507,694 | 4/1970 | Eichler et al. | 264—Dig. 17 |
| 3,574,684 | 4/1971 | Higashi | 264—Dig. 17 |
| 3,329,750 | 7/1967 | Growald | 264—45 |

H. S. COCKERAM, Primary Examiner

U. S. Cl. X.R.

264—25, 46

UNITED STATES PATENT OFFICE
CERTIFICATE OF CORRECTION

Patent No. 3,816,574       Dated June 11, 1974

Inventor(s) William C. Heller, Jr., et al

It is certified that error appears in the above-identified patent and that said Letters Patent are hereby corrected as shown below:

Col. 1   line 47    Delete "many" and substitute therefor ---may---

Signed and sealed this 3rd day of December 1974.

(SEAL)
Attest:

McCOY M. GIBSON JR.
Attesting Officer

C. MARSHALL DANN
Commissioner of Patents